(12) United States Patent
Hastings et al.

(10) Patent No.: US 12,489,313 B2
(45) Date of Patent: Dec. 2, 2025

(54) AUTOMATIC ISOLATION SWITCH FOR A MICROGRID

(71) Applicant: ASCO Power Technologies, L.P., Florham Park, NJ (US)

(72) Inventors: Jonathan Hastings, Clemson, SC (US); Victor E. Bonachea, Elmwood Park, NJ (US); Matthew Schneider, Florham Park, NJ (US)

(73) Assignee: ASCO Power Technologies, L.P., Florham Park, NJ (US)

( * ) Notice: Subject to any disclaimer, the term of this patent is extended or adjusted under 35 U.S.C. 154(b) by 0 days.

(21) Appl. No.: 17/865,013

(22) Filed: Jul. 14, 2022

(65) Prior Publication Data

US 2023/0013208 A1    Jan. 19, 2023

Related U.S. Application Data

(60) Provisional application No. 63/222,461, filed on Jul. 16, 2021.

(51) Int. Cl.
*H02J 9/06* (2006.01)
*H02J 3/00* (2006.01)

(52) U.S. Cl.
CPC ............ *H02J 9/062* (2013.01); *H02J 3/0012* (2020.01); *H02J 9/068* (2020.01)

(58) Field of Classification Search
CPC .......... H02J 9/062; H02J 3/0012; H02J 9/068; H02J 3/007
USPC ........................................................ 307/142
See application file for complete search history.

(56) References Cited

U.S. PATENT DOCUMENTS

| 9,711,967 | B1* | 7/2017 | Czarnecki | H02J 5/00 |
| 10,044,191 | B2* | 8/2018 | Allert | H02J 3/381 |
| 2011/0115295 | A1* | 5/2011 | Moon | H02J 3/32 |
| | | | | 307/65 |

(Continued)

FOREIGN PATENT DOCUMENTS

| KR | 10-20140028482 A | 3/2014 |
| KR | 10-20140078991 A | 6/2014 |
| KR | 10-2020-0032293 A | 3/2020 |

OTHER PUBLICATIONS

International Search Report and Written Opinion in International Application No. PCT/US2022/37238 (dated Nov. 7, 2022).

*Primary Examiner* — Richard Tan
(74) *Attorney, Agent, or Firm* — Troutman Pepper Locke LLP

(57) ABSTRACT

An automatic isolation switch (AIS) system is provided for controlling a supply of electrical power to a load. The system includes a switch and a controller. The switch is connected between a first power system and the load and between the first power system and a second power system. The first power system includes a grid, and the second power system includes a power source and an inverter coupled to the power source. The controller is configured to detect an adverse power condition on the first power system for supplying electrical power to the load; to isolate, via at least one switch, the first power system from the load and the second power system, in response to the detecting of the adverse power condition; and to activate the inverter of the second power system to supply electrical power from the second power system to the load.

23 Claims, 12 Drawing Sheets

(56) References Cited

U.S. PATENT DOCUMENTS

| | | | |
|---|---|---|---|
| 2011/0266975 A1* | 11/2011 | Yu | H05B 41/2828 |
| | | | 315/307 |
| 2014/0266289 A1* | 9/2014 | Della Sera | H02J 3/38 |
| | | | 324/761.01 |
| 2015/0380968 A1 | 12/2015 | Lee | |
| 2017/0271875 A1 | 9/2017 | Narla | |
| 2018/0301903 A1* | 10/2018 | Majumder | H02J 7/0029 |
| 2020/0212825 A1* | 7/2020 | Li | H02J 3/381 |

* cited by examiner

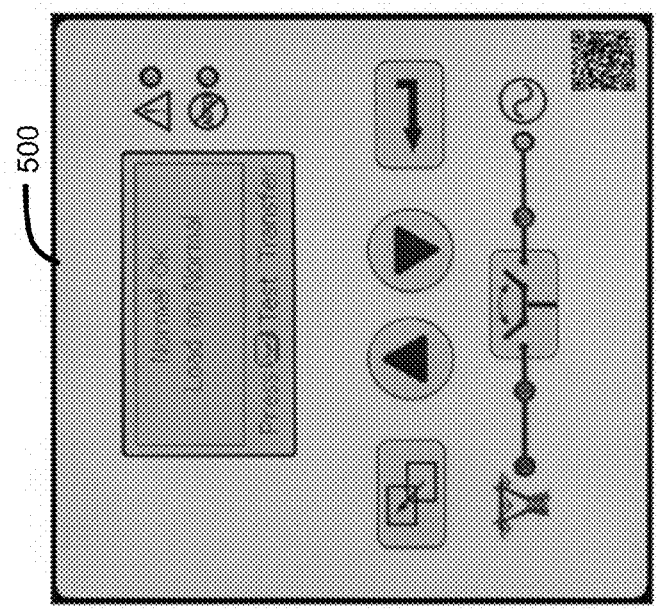

- LEDs
  - Breaker Closed = Replaces Connected to Normal
  - Breaker Open (Isolated) = Replaces Connected to Emergency
  - Line Side Power Acceptable = Replaces Utility Acceptable
  - Load Side Power Acceptable = Replaces Emergency Acceptable
  - Alarm = stays as is
  - Auto/Manual = stays as is
- Shown on Screen
  - Breaker Tripped Status, also an alarm
  - Timer is timing
  - Voltages
  - Freq
  - breaker status
  - inverter status
  - alarms
- Soft Buttons
  - Start Test Sequence
  - Bypass Timers
  - Auto/Manual Selector

FIG. 5

DIP Switch and Settings  700

- Settings adjustable via screen
  - PU/DO
    - Under Freq DO
    - Under Freq PU
    - Undervolt DO
    - Undervolt PU
    - V Unbalance
- Timers
  - Tie to forming delay
  - Breaker close timer
  - forming to tie delay (test)
  - Open delay
  - Forming to tie delay (failure)
- Features On/Off
  - Proactive Isolation (same as proactive e-start)
  - Recovery Mode ( change mode then close vs close then change mode)
  - Auto vs Remote (inverter in charge)

- DIP switches still used for setting nominals

FIG. 7

AUTOMATIC ISOLATION SWITCH FOR A MICROGRID

RELATED APPLICATION

The present application claims priority to U.S. Provisional Patent Application Ser. No. 63/222,461, filed on Jul. 16, 2021 and entitled AUTOMATIC ISOLATION SWITCH FOR A MICROGRID, which is incorporated by reference herein in its entirety.

TECHNICAL FIELD

The present disclosure relates to a power distribution system, and more particularly, to a system and method for controlling a supply of electrical power to a load in a power distribution system with an inverter-based backup/secondary power source or system.

BACKGROUND

Power distribution systems are employed to provide electric power to operate equipment in various applications. These applications may require nearly constant supply of reliable electrical power to operate effectively. For example, hospitals may require a constant and reliable supply of electricity to ensure medical equipment in operating rooms and the like function when needed. Further, food retailers such as supermarkets and grocery stores may require a constant and reliable supply of electricity to properly operate refrigeration systems associated with display cases and freezers to prevent food spoilage.

While utility companies generally provide electrical power consistently and reliably across their power grids, such power is sometimes interrupted due to inclement weather, unforeseen accidents, maintenance or other factors. Electrical power consumers seeking to mitigate or avoid even minor interruptions in their power supply often rely on backup systems such as generators to supply electrical power during periods when electrical service from a utility company is interrupted. An automatic transfer switch (ATS) can enable these consumers to switch between a primary electrical source (e.g., grid from a utility company or microgrid) and a backup generator when one source becomes unreliable or requires maintenance; however the ATS may be sub-optimal for use with other types of backup/secondary power systems (or power sources).

SUMMARY

In accordance with an embodiment, a method of controlling a supply of electrical power to a load is provided. The method comprises: detecting, by a controller, an adverse power condition on a first power system for supplying electrical power to the load, the first power system including a grid; isolating, by at least one switch, the first power system from the load and a second power system, in response to the detecting of the adverse power condition, the second power system including a power source and an inverter, coupled to the power source, for supplying electrical power from the power source; and activating, by the controller, the inverter of the second power system to supply electrical power from the second power system to the load.

In various embodiments, the isolating isolates the first power system when an amount of time of the detected adverse power condition on the first power system meets a first time threshold, and the power source of the second power system comprises a battery, fuel cell or photovoltaic module.

In various embodiments, the activating comprises: controlling, by the controller, the inverter, via a control signal, to implement a grid-tie mode for supplying electrical power from the second power system to the load via the inverter.

In various embodiments, the method can further comprise: detecting a return of electrical power supplied from the first power system; connecting, by the at least one switch, the first power system to the load and the second power system to enable supply of electrical power from the first power system to the load in response to detecting the return of electrical power; and controlling, by the controller, the inverter, via a control signal, to implement: a grid-forming mode for supplying electrical power from the second power system to the first power system, in response to detecting the return of electrical power, or a grid-following mode for enabling supply of the electrical power from the first power system including a grid to the load in response to detecting the return of electrical power. Furthermore, in some embodiments, the connecting connects, by the at least one switch, the first power system to the load and the second power system when an amount of time of the return of electrical power at a first power system meets a second time threshold.

In various embodiments, the method can further comprise: storing energy in a capacitor; and powering, via the stored energy from the capacitor, at least the controller to enable operation of the controller for at least a period of time after the adverse power condition occurs on the first power system.

In various embodiments, the second power system is automatically de-activated when the adverse power condition occurs. The adverse power condition comprises a power outage.

In various embodiments, the activating comprises controlling the inverter to delay or stop for a period of time a supply of electrical power from the second power system to the load while the adverse power condition continues on the first power system.

In accordance with an embodiment, a system is provided for controlling a supply of electrical power to a load. The system comprises at least one switch connected between a first power system and the load and between the first power system and a second power system. The first power system includes a grid. The second power system includes a power source and an inverter, coupled to the power source, for supplying electrical power from the power source. The system further comprises a controller configured to: detect an adverse power condition on the first power system for supplying electrical power to the load, isolate, via at least one switch, the first power system from the load and the second power system, in response to the detected adverse power condition, and activate the inverter of the second power system to supply electrical power from the second power system to the load.

In various embodiments, the controller isolates the first power system when an amount of time of the detected adverse power condition on the first power system meets a first time threshold, and the power source of the second power system comprises a battery, fuel cell or photovoltaic module.

In various embodiments, to activate the inverter, the controller is configured to control, via a control signal, the inverter to implement a grid-tie mode for supplying electrical power from the second power system to the load via the inverter.

In various embodiments, the controller is further configured to detect return of electrical power supplied from the first power system; connect, via the at least one switch, the first power system to the load and the second power system to enable supply of electrical power from the first power system to the load in response to the detected return of electrical power. The controller is further configured to control the inverter, via a control signal, to implement: a grid-forming mode for supplying electrical power from the second power system to the first power system, in response to the detected return of electrical power, or a grid-following mode for enabling supply of the electrical power from the first power system including a grid to the load in response to the detected return of electrical power. Furthermore, in some embodiments, the at least one switch connects the first power system to the load and the second power system when an amount of time of the return of electrical power at a first power system meets a second time threshold.

In various embodiments, the system further comprises a capacitor for storing energy. The controller is powered, via the stored energy from the capacitor, to enable operation of the controller for at least a period of time after the adverse power condition occurs on the first power system.

In various embodiments, the second power system is automatically de-activated when the adverse power condition occurs. The adverse power condition comprises a power outage.

In various embodiments, the controller controls the inverter to delay or stop for a period of time a supply of electrical power from the second power system to the load while the adverse power condition continues on the first power system.

In various embodiments, the controller is further configured to implement a plurality of configurable operational modes for an automatic isolation switch, which comprises the at least one switch and the controller.

In various embodiments, the system further comprises a user interface for the controller, and an electrical enclosure for housing the at least one switch, and the controller.

In accordance with an embodiment, the power distribution system comprises the first power system, the second power system, and the system, as described herein, for controlling a supply of electrical power to a load.

In accordance with an embodiment, a non-tangible computer readable medium is provided, to store computer code, which when executed by a processor, performs a method of controlling a supply of electrical power to a load, the method comprising: detecting an adverse power condition on a first power system for supplying electrical power to the load, the first power system including a grid; controlling at least one switch to isolate the first power system from the load and a second power system, in response to the detecting of the adverse power condition, the second power system including a power source and an inverter, coupled to the power source, for supplying electrical power from the power source; and activating the inverter of the second power system to supply electrical power from the second power system to the load.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

FIG. 5 illustrates an example of a user interface for an automatic isolation switch, in accordance with an embodiment of the present disclosure.

FIG. 7 illustrates an example of dip switch settings on a controller (of an automatic isolation switch) for setting nominal voltage and similar setting, in accordance with an embodiment of the present disclosure.

Identical reference numerals have been used, where possible, to designate identical elements that are common to the figures. However, elements disclosed in one embodiment may be beneficially utilized on other embodiments without specific recitation.

DETAILED DESCRIPTION

Figure 1:
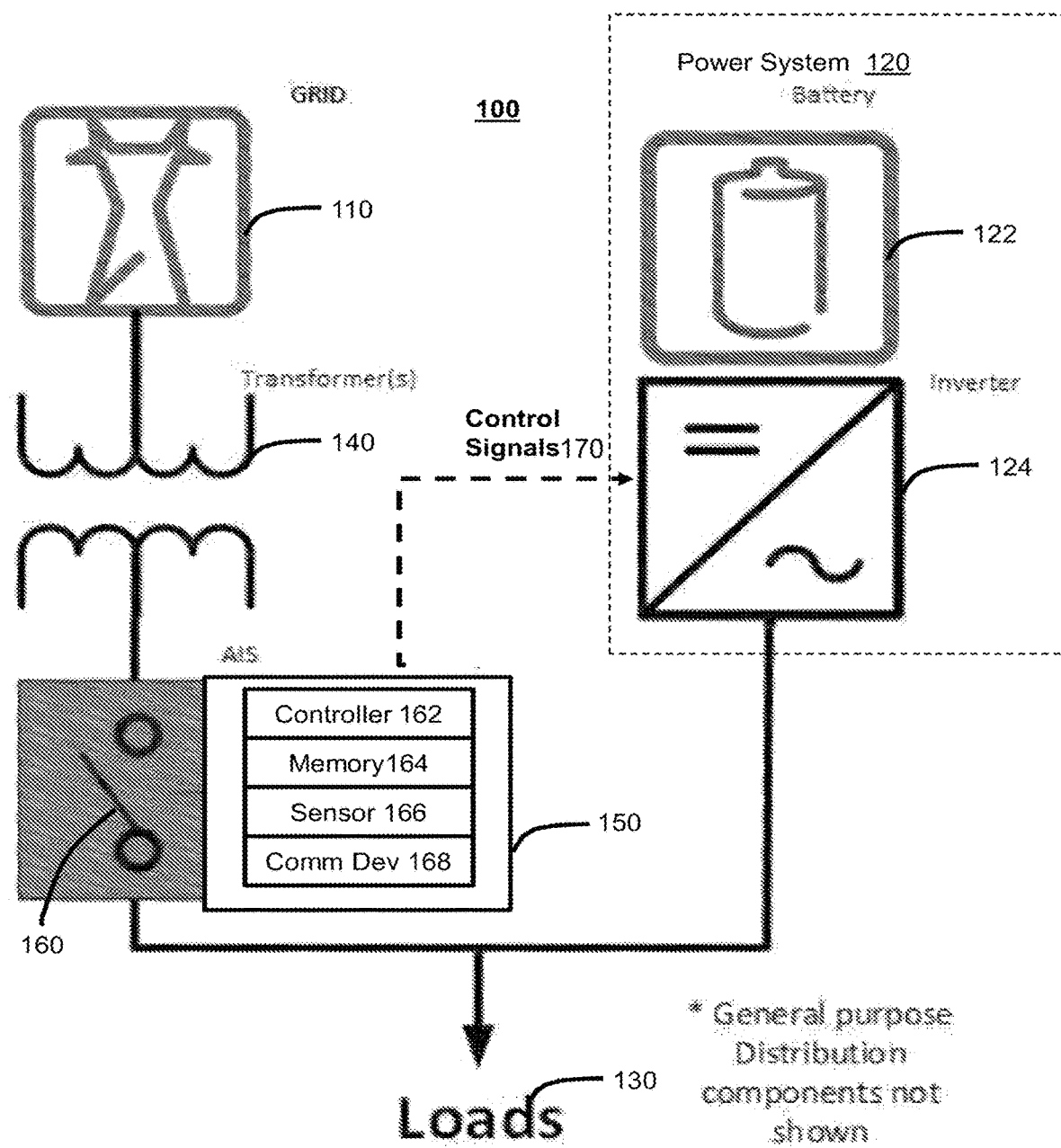
FIG. 1 is a diagram illustrating an example of a power distribution system which employs an automatic isolation switch (also referred to as "AIS"), in accordance with an embodiment of the present disclosure.

The present disclosure is directed to a method and system for power management, such as controlling isolation switch operations and/or other power management operations to selectively control the supply of power to one or more loads (generally referred to as "load") from a power distribution system with a primary power source (or system) such as a power grid (e.g., an electrical utility grid, microgrid, etc.) and one or more secondary inverter-based power sources (or systems) such as, for example, a battery system. The battery system can include a battery and an inverter, coupled to the battery, for supplying electrical power from the battery. Embodiments described in the present disclosure provide capabilities of an automatic isolation switch (AIS) to isolate a power grid upon detecting an adverse power condition on the grid (or power supplied from the grid) and automatically configure the battery system to provide power to one or more loads. An adverse power condition can include, but is not limited to a power outage, power fluctuations or irregularities, significant loss of power/voltage/current, a fault condition, or other unacceptable or unwanted power condition on a power system. An adverse power condition can be detected, for example, when a monitored parameter(s) (e.g., voltage, power, power or voltage over time, etc.) on the power system satisfies (or not) one or more parameter threshold(s). In various embodiments, the battery system can be part of a microgrid, which is connectable to the load and the power grid.

For example, a microgrid is a localized grouping of electric power generation sources and loads. A microgrid may also be referred to as, without limitation, a smart-grid, mini-grid, or virtual power plant. When a microgrid power source experiences an outage, the microgrid may be designed to operate using an inverter-based source that may include, but is not limited to, a Battery Energy Storage System (BESS) or Fuel Cell (FC) or other battery system. A battery system such as the BESS is normally connected to the loads and microgrid when the grid is up (e.g., normal grid operation), and the BESS is in Current Source mode. When the microgrid goes down or fails, the BESS will initially go out as well, so the entire system is without power. The BESS can switch to a Voltage Source mode to establish the new source for the microgrid. However, in order to do this successfully, the BESS needs to be isolated from the dead microgrid; otherwise, the small BESS will apply voltage to the entire microgrid and will likely fail.

There are automatic transfer switch(es) or ATS(s) which are employed to switch between a primary power source such as utility grid and a secondary power source such as a generator in the event of power failure at the utility grid. An ATS in general is powered by the destination source and requires this power to mechanically switch from the microgrid to the generator. However, the ATS mechanism cannot switch or isolate without power on the secondary source, and a battery system such as the BESS would require separation to supply power. This presents a "chicken and egg" problem.

Accordingly, an automatic isolation switch (AIS) system and method can be provided, as described herein, to address these and other issues, when a battery system is to be employed, for example, as a backup/secondary power source in a power distribution system for supplying electrical power to a load. The AIS can include a controller, and at least one switch which is connected between the grid and the load and between the grid and the battery system. The AIS, which operates under the control of the controller, can be configured to detect a power outage or other adverse power condition at the grid, to electrically isolate (e.g., disconnect) via the at least one switch the grid from the load and the battery system in response to the detection, and to activate the battery system (or component(s) thereof such as for example the inverter) to supply electrical power from the battery system to the load. When power returns at the grid, the AIS can integrate (e.g., connect or re-connect) the grid to the load as well as the grid to the battery system via the at least one switch, and control an operation of the battery system to a suitable operational mode (e.g., an inverter mode) when electrical power is to be supplied from the grid to the load.

In various embodiments, the battery system, for example, can be controlled and configured to operate in different operational inverter modes according to conditions on the power distribution system. The inverter modes can, for example, include but are not limited to: a grid-forming mode in which the battery system can form a microgrid with the load in order to supply electrical power to the load; a grid-following mode in which the battery system can provide or facilitate provision of electrical power from the grid to the load; a grid-tie mode in which the battery can supply electrical power to the grid; and so forth.

In some embodiments, the battery system also can be a battery energy storage system (BESS) or other inverter-based battery system suitable for use as a backup/secondary power source in a power distribution system.

In various embodiments, the switch can be a single switch or multiple switches for selectively connecting the grid, load and/or the battery system to each other or disconnecting the grid, load and/or the battery system from each other. The switch can, for example, include a circuit breaker(s), contactor(s), relay(s), and/or other switching device(s).

In various embodiments, the AIS can isolate or integrate the grid according to additional detected conditions using thresholds which may be user configurable. For example, the AIS can isolate (e.g., disconnect) the grid in response to an amount of time of the power outage (or other adverse condition) satisfying a time/duration threshold. The AIS also can integrate (e.g., connect) the grid in response to an amount of time of the return of power (or normal power condition) at the grid satisfying a power return time/duration threshold. These and other conditions can help to detect the power stability on the grid, when deciding whether to isolate or integrate the grid, in order to reduce false positives and nuisance switching.

Furthermore, in various embodiments, in the event of an adverse power condition, the AIS can control the battery system to selectively supply power to the load, e.g., periodically or aperiodically turn ON and OFF the supply of power from the battery system to the load, or delay (e.g., time delay for a determined or predefined time period) turning ON the supply of power from the battery system. In other words, the AIS can control the battery system or components thereof such as the inverter, directly or indirectly, to delay or stop for a period of time a supply of electrical power from the battery system to the load while the adverse power condition exists. In this way, the AIS can conserve energy from the battery system, which may be limited. For example, to control supply of power from the battery system, the AIS can selectively control the isolation switch and/or the inverter of the battery system, according to various factors including but not limited to: an amount of available energy on the battery system (which may be monitored using a sensor), a length of time of the adverse power condition (which may be monitored using a counter/timer from when the adverse power condition occurs), a predefined schedule(s), the nature or severity of the adverse power condition, and so forth.

In various embodiments, the AIS also can include a local energy storage device, such as a capacitor or other chargeable/re-chargeable storage device, which can store a sufficient amount of energy from the grid, battery system or other connected power source when live. In this way, in the event of an adverse power condition at the primary source such as the grid and deactivation of the battery system, the AIS or its components can still operate using power from the local energy storage device for a sufficient time period to isolate the grid and activate the battery system.

These and other features of the present disclosure will be described in further detail below with reference to the example figures.

FIG. 1 is a diagram illustrating an example of a power distribution system 100, in accordance with an embodiment. The system 100 can include a first power system including a power grid 110, a second power system 120, one or more loads 130 (also referred to as "load 130"), and an automatic isolation switch (AIS) 150 which is connected to the power grid 110, the power system 120 and the load(s) 130. In this example, the AIS 150 is connected between the power grid 110 and the power system 120 and load 130. The grid 110 can be a primary power source for supplying electrical power to the load 130, and the power system 120, which can be part of a microgrid, can be a secondary source for supplying electrical power to the grid 110 and/or load 130 according to conditions on the system 100. The AIS 150 can be coupled to a grid 110 via one or more transformers 140 in the first power system.

In the event of an adverse power condition such as for example a power outage of power supplied from the grid 110, the AIS 150 can detect the power outage, isolate the grid 110 from the load 130 and the power system 120, and can control (or configure) the power system 120 (or component(s) thereof) to initiate or perform a selected mode of operation. For example, in response to detection of the power outage and after isolation of the grid, the AIS 150 can activate the power system 120 (or component(s) thereof) to supply electrical power to the load. These and other operational modes of the power system 120 can, for example, include: supply electrical power to the load 130 (e.g., a grid-forming mode), facilitate supply of electrical power to the load 130 from the grid 110 (e.g., a grid-following mode), supply electrical power to the grid (e.g., a grid-tie mode), turn ON/OFF the power system 120 or components thereof, or other operational modes for the battery system (or components thereof).

The power grid 110 can be an electrical power grid, such as a utility grid(s), a microgrid or any other type of power grid which can supply electrical power to a load. In this example, the grid 110 can be the primary power source for supplying electrical power to the load 130. The power supply from the grid 110 can be monitored using one or more sensors (e.g., voltage sensor, current sensor, etc.) to detect power conditions on the grid 110 and/or between the grid 110 and the AIS 150, such as for example, a power outage of power supplied from the grid 110 or other adverse power condition as to the supply of power, a return of power supplied from the grid 110 or return to normal power condition as to the supply of power, stability of power supplied from the grid 110, etc. The one or more sensors can be provided in the AIS 150, at the grid 110, between the grid 110 and the AIS 150, at the load 130 or a combination thereof. In various embodiments, the AIS 150 can be configured to detect a power outage (or other adverse power condition) or a return of power (or return to normal power condition) as to the power supplied from the grid 110 when the monitored parameter of the power supply from the grid 110 (e.g., voltage, power, etc.) satisfies (or not) a threshold(s) (e.g., a threshold, condition, range, etc.). To improve detection and reduce false positive (or nuisance switching), the AIS 150 also can employ time/duration thresholds for a detected power condition before disconnecting or connecting the grid 110 (or power system associated therewith) from or to, respectively, other components such as the power system 120 and/or load 130.

The power system 120 can include a power source such as for example one or more batteries ("battery") 122, and also can include other power components for facilitating the delivery of electrical power from the battery 122. These components can include an inverter 124 as well as other power conditioning/conversion circuitry depending on the power application. In this example, the inverter 124 is coupled to the battery 122 and can convert a flow of electrical power from the battery 122 to a desired flow type.

For example, in some embodiments, the inverter 124 can be configured to convert DC current to AC current. The inverter 124 also can be configured to operate in various operational modes (e.g., a grid-forming mode, grid-following mode, grid-tie mode, ON/OFF, and so forth).

In various embodiments, the power system 120 can be a battery energy storage system (BESS), which can be part of a microgrid connectable to the grid 110 and the load 130. The power system 120 can collect energy from one or more energy sources, such as for example a power grid (e.g., grid 110 or other grid) or renewable power sources (e.g., solar, etc.), and can store the collected energy in the battery 122. The battery 122 can be used to supply power to the grid 110 and/or load 130, depending on the selected operating mode of the inverter 124 of the power system 120 and the state of the power distribution system 110 (e.g., adverse power condition, normal power condition, etc.). In the event of an adverse power condition, the power system 120 (or its inverter 124) can be configured to de-activate (e.g., turn OFF, suspend operation, etc.). In this example, the power system 120 is a battery system with a battery as the power source; however, it should be understood that the power source(s) of the power system 120 can be any suitable electrical power source (e.g., fuel cell, photovoltaic module(s)/solar power module(s), etc.) which can be used in combination with an inverter 124 to supply electrical power, as described herein in the various embodiments.

The AIS 150 can include a switch(s) 160, controller(s) 162, memory 164, sensor(s) 166, and communication device(s) 168. The various components of the AIS 150 may be interconnected via a bus system to facilitate communication therebetween.

The switch 160 can be operated to selectively isolate/disconnect or integrate/connect components in the power distribution system 100 from or to each other, respectively. In this example, the switch 160 can be operated to selectively integrate/connect the grid 110 (or its associated power system) to the power system 120 and the load 130 or isolate/disconnect the grid 110 (or its associated power system) from the power system 120 and the load 130, depending on various factors including, for example, conditions on the power distribution system 100 (e.g., adverse power condition as to supplied power from the grid 110, a return to normal condition as to the power supplied from the grid 110, etc.). The switch 160 can include a circuit breaker(s), electromechanical contactor(s), relay(s), solid state devices, and/or other suitable devices for electric power switching (or isolating). In one example, the switch 160 can include a solenoid that activates an electrical contact to move between a connection to a first conductor and a connection to a second conductor. Other examples are also possible.

The switch 160 can be operably switched between multiple states. For example, in a first state, the switch 160 can connect/integrate the grid 110 to the power system 120 and the load 130. In a second state, the switch 160 can disconnect/isolate the grid 110 from the power system 120 and the load 130.

The controller 162 can be configured to control the various components of the AIS 150 and perform various operations associated with detecting, switching (e.g., isolating/disconnecting, integrating/connecting, etc.) and other operations to selectively control the supply of electrical power from one or more power sources or systems, such as for example the grid 110 and/or the power system 120, to the load 130 under various conditions.

In this example, the controller 162 can detect conditions on the power distribution system 100 or components thereof (e.g., the grid 110, the power system 120, the load 130, etc.), via sensor data from the sensor(s) 166 (e.g., voltage sensor(s), current sensor(s), etc.) or other sensors in the system 100 which can be used to monitor electrical conditions at the grid 110 or the load 130 or other components of the power distribution system 100. The controller 162 also can control the switch 160 to selectively switch between the first state in which the grid is connected/integrated to the power system 120 and the load 130 and the second state in which the grid is disconnected/isolated from the power system 120 and the load 130. The controller 162 also can control (or configure) other components of the power distribution system 100, such as the power system 120 (or component(s) thereof including for example the inverter 124) to operate in various operational modes. Therefore, the controller 162 may provide control signals 170 to the switch 160 to selectively control the state of the switch 110, and may also provide control signals to the power system 120 (or its inverter 124) to selectively control the operation of the power system 120 including but not limited to the inverter mode(s) described herein. The controller 162 can control the switch 160 and the power system 120 (or component(s) thereof) according to detected conditions on the power distribution system 100 and/or other factors. As previously discussed herein, the detected conditions can include but are not limited to a power adverse power condition as to power supplied from the grid 110, return to normal power condition of power supplied from the grid 110, and so forth. The controller 162 also can be configured to implement or control the various functions and operations associated with the AIS and power distribution system, as described herein.

The controller 162 can be, for example, a processing circuit(s), a processor(s) or controller(s) such as a microcontroller, a microprocessor, an application specific integrated circuit (ASIC) device, field programmable gate array (FPGA), programmable logic controller (PLC) or other processing system or the like or a combination thereof. In FIG. 1, the controller 162 can be communicatively coupled to a memory 164, which can for example be incorporated into the controller 162 or arranged at another location. The controller 162 can communicate with other devices and systems (e.g., the power system 120 or its components, switch(es) 160, sensor(s) 166, etc.) via a communication device (or interface) 168 to implement wireline and/or wireless communication.

The memory 164 can store any data required by the controller 162 to perform the operations of the methods and processes described herein. For example, the memory 164 can store data such as operating parameters for the power distribution system 100 including AIS operating parameters, thresholds and other parameters associated with the operation of the AIS or other devices or systems associated therewith. The memory 164 can be integrated with the controller 162, or the memory 164 can be external and remotely coupled to the controller 162. The memory 164 can be, for example, random access memory (RAM), read only memory (ROM), electronic erasable programmable read only memory (EEPROM), flash memory, or other volatile or non-volatile memory (i.e., non-transitory computer readable media).]

Furthermore, the AIS 150 can be configured to operate in several AIS operational "modes". A few non-limiting examples of these modes are provided below, as follows:

Automatic: The AIS 150 is the primary controller and manages the detection, decisions, isolation, initiation of the secondary source, and reconnection, etc.

Remote: The AIS is 150 a secondary actor in the system, where it can provide all the same functions as the Automatic mode; however, the AIS 150 is not making the decision to isolate/reconnect or to initiate the secondary source.

Manual: The AIS 150 in this mode can isolate/reconnect by manual local interface (see, e.g., FIG. 5). The value of the AIS 150 here is to manage the secondary source as well as determine the acceptability of the primary source.

Load shed: The AIS 150 in this mode is "downstream" of all power sources and isolates when the power source is unacceptable. This provides disconnection for any downstream loads. Based on the configuration, the AIS 150 can reconnect the loads based on 1) an interface with another controller, 2) when a source is acceptable or 3) other scenario.

The above simply provides examples of an automatic isolation switch and other components of a power distribution system, in accordance with various embodiments.

Figure 2A:
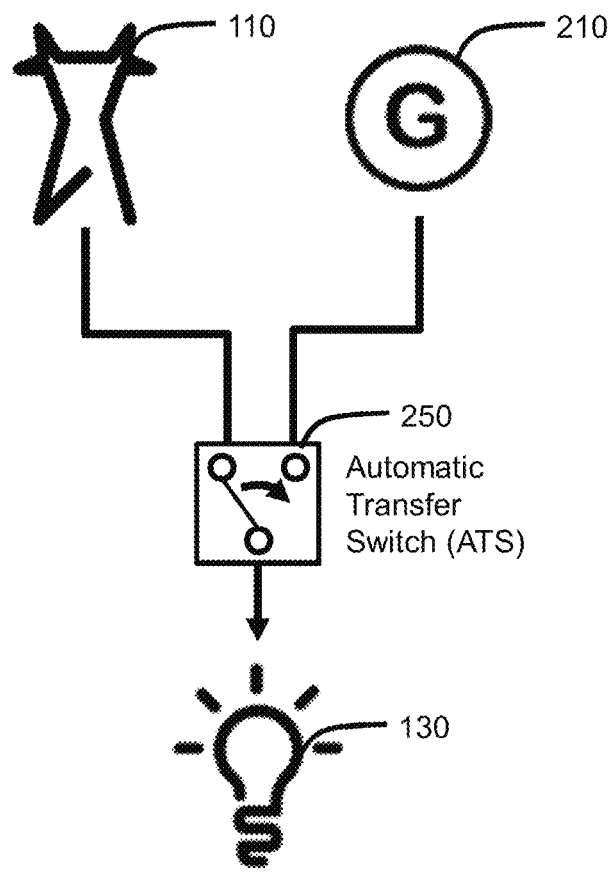
FIG. 2A illustrates an example power distribution system with an automatic transfer switch (ATS) for switching between a grid and a backup generator.
Figure 2B:
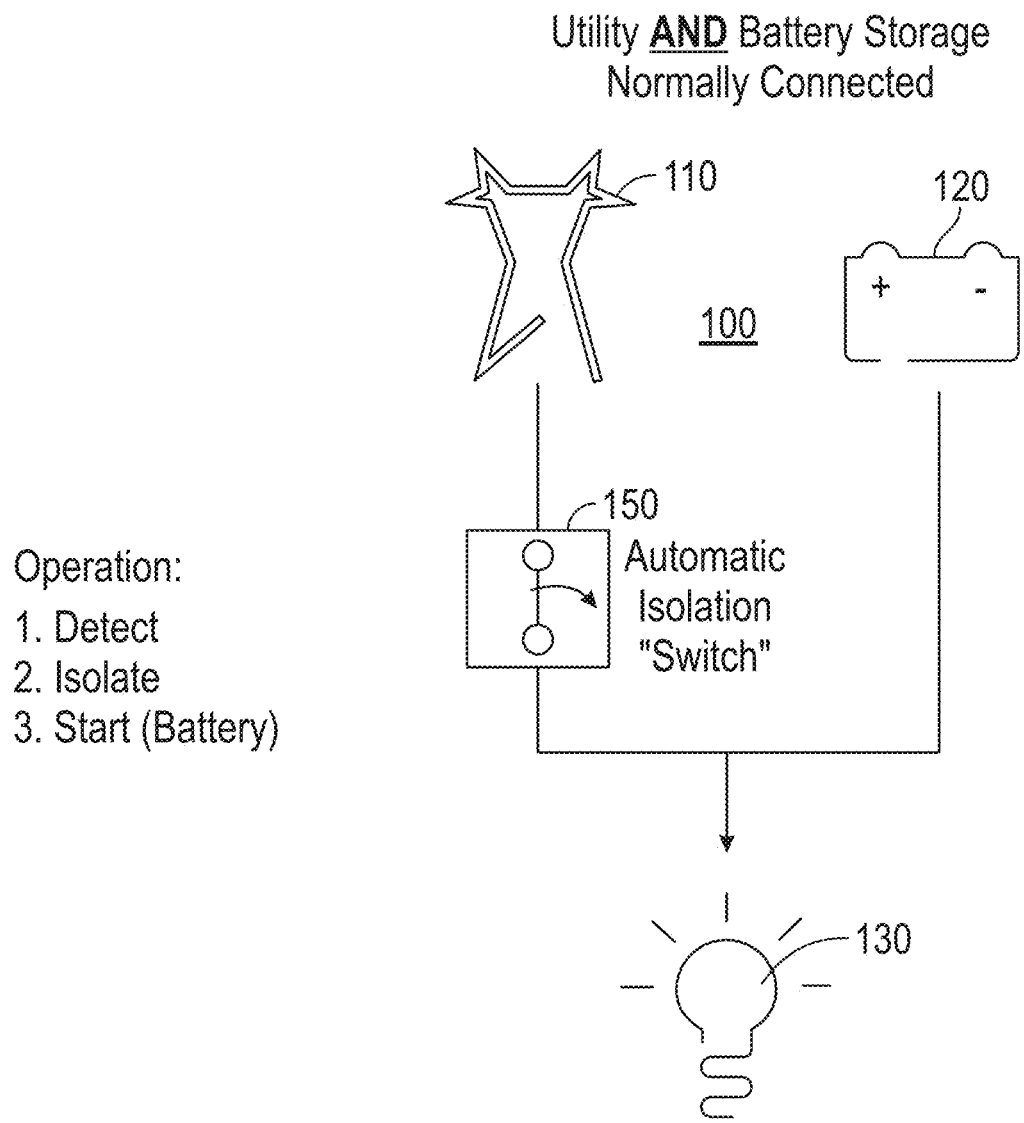
FIG. 2B illustrates an example power distribution system with an automatic isolation switch of FIG. 1, in accordance with an embodiment of the present disclosure.

FIG. 2B shows another view of the AIS 150 of FIG. 1. As explained herein, the AIS 150 can provide for at least two main functions, namely the "controller" and the "switch". The controller function can provide all of the voltage sensing, inputs, outputs, and logic such as decisions, delays, etc. The switch function can provide the electrical isolation and includes inputs and outputs to interface with the controller and possibly directly with other systems depending on the mode. There may be additional auxiliaries, interfaces and interconnections. An advantage of the AIS 150 is that it can be designed to be a purpose build device with minimal "configuration" required for the application.

In various embodiments, the AIS 150 can include some "stored" power to operate. When the primary power source becomes unacceptable (e.g., grid 110 is down), the power distribution system 100 may lose power, while the AIS 150 is still in a connected state. The AIS 150 requires some power and a signal to isolate. This isolation can take place prior to the establishment of any secondary power. It is possible to reconnect to the grid 110 in either "closed" mode (e.g., make before break) where the load 130 does not see any loss of power, or in "open" mode (e.g., breaker before make) where the load 130 does see a loss of power but then reestablished. In some embodiments, the controller of the AIS 150 has voltage sensing on both the "top" and "bottom" of the switch. This can allow for detection of two (2) independent sources as well as synchronization on closing.

Figure 3:
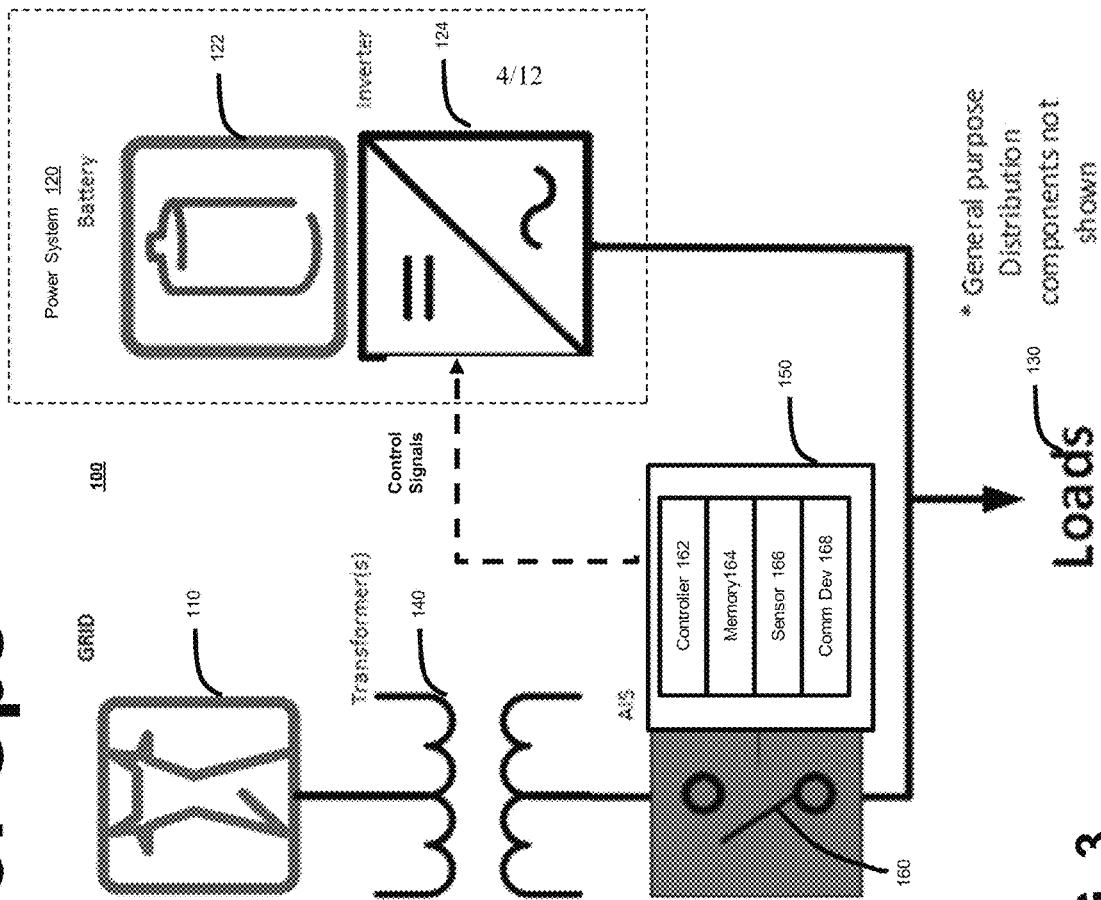
FIG. 3 illustrates an example sequence of operations for an automatic isolation switch and other associated devices and systems, in accordance with an embodiment of the present disclosure.

In FIG. 3, an example of a sequence of operations for using the AIS 150 of FIG. 1 is shown, in accordance with an embodiment. For example, when the grid 110 is operating within normal operating parameters, the AIS 150 can operate the switch 160 (e.g., closes the switch) to connect/integrate the grid 110 to the power system 120 and the load 130, and control the power system 120 (or its inverter 124) to operate in the grid-tie mode (e.g., supplying electrical power to the grid) at (1). When power supplied from the grid 110 goes off or down at (2), the AIS 150 can wait for a certain amount of time to pass, such as a first delay timer at (3). For example, this first time threshold ensures that the grid 110 is truly down and not a false positive. The threshold may be configurable and may be adapted based on various conditions and system setups. Once the threshold time has passed, the AIS 150 can use energy stored in a capacitor or other energy storage device (e.g., uses the last bit of power from the capacitor) to send a bit signal that opens the circuit via the switch 160 (e.g., a circuit breaker, etc.) and starts the isolation of the grid 110 at (4). Then, the AIS 150 can send a control signal to the power system 120 to change modes, e.g., from a grid-tie mode to a grid-forming mode. The power system 120 (or component(s) thereof such as the inverter 124) receives the control signal, and activates the power system 120, for example, by activating the system 120 (e.g., turning ON the system) and/or changing the inverter mode, e.g., from a grid-tie mode to a grid-forming mode, at (5) and (6). In this way, the power system 120 can supply electrical power to the load 130.

The power system 120 can continue to supply electrical power to the load 130 at (7). When the return of power from the grid 110 is detected, the AIS 150 can wait for a certain amount of time to pass, such as a second delay timer. For example, this second time threshold can ensure that the grid 110 is truly up/live and not a false positive. The threshold may be configurable and may be adapted based on various conditions and system setups. Once the second threshold time has passed, the AIS 150 can change the mode of the power system via a control signal from the grid-forming mode to the grid-tie mode and operate the switch 160 (e.g., closes the switch 160) to connect/integrate the grid 110 to the power system 120 and the load 130 at (9) through (12). In this way, the grid 110 can supply electrical power to the load 130.

Although the above operational example in FIG. 3 is described with reference to the grid-tie mode, the power system 120 can implement a grid-following mode instead of the grid-tie mode when the grid 110 is operating within normal parameters.

There are several differences in how the AIS 150 of the present disclosure operates as compared to a system with a diesel generator and a traditional transfer switch, e.g., an ATS 250 in FIG. 2A. For example, one of the major differences in the AIS system is the use of a power system with a power source (e.g., battery, fuel cell, solar, etc.) and an inverter. When the power source is a battery (e.g., 122) or other rechargeable power source, the power system 120 can be connected to the grid 110 in order to charge and discharge the rechargeable power source of the power system 120.

Another major difference is the order of operations for the AIS 150. In a system with a generator, when the grid goes out, the automatic transfer switch or ATS, such as ATS 250 in FIG. 2A, and its controller sense the power outage at the grid 110. The ATS controller can send a signal to the diesel generator 210 to start the generator 210. The power from the generator 210 is then used to activate the mechanical transfer switch of the ATS 250. By contrast, in the power distribution system of the present disclosure, a power system 120 with a power source and an inverter (e.g., as shown in FIGS. 1 and 3) instead of a generator 210 (e.g., in FIG. 2A) is employed. The power system 120 is connected to the grid 110. When the supply of power from the grid 110 goes down, the power system 120 which follows the grid 110 can also go down. In some embodiments, the power system 120 (or its inverter 124) can operate in at least two (2) modes, such as a grid-following mode, or a grid-forming mode. For example, when the power system 120 is connected to an active grid 110, the power system 120 can sit back in a grid-following mode and provide whatever current the load 130 may need. When the power supplied from the grid 110 goes down and becomes unacceptable, the power system 120 can switch operational modes. For example, there is a transition from one operational inverter mode to the other to avoid having two voltage sources fighting each other. In this case, the grid 110 and the power system 120 both are not trying to set a voltage for the load 130. As such, in grid-following mode, the power system 120 is configured to sit back and just provide the current coming from the grid 110.

In the grid-forming mode, the power system 120 can switch to this operational mode when the grid 110 goes bad. For example, the power system 120 in this mode can become the primary power source. But the problem is, if the power system 120 simply switches operational modes, then the dead grid 110 can look like a huge or significant load, so the power system 120 would try to power, for example, the grid 110 and whatever is connected to the grid 110 (e.g., your transmission lines in your house, your neighbor's house, and your neighbors' neighbors' house and so on). Accordingly, it is necessary to isolate the local microgrid connected to the utility grid 110. In comparison, in a generator-based solution such as in the power distribution system of FIG. 2A, the grid 110 is isolated when the ATS 250 switches over to the generator 210. There is a connection from the generator 210 to the load 130 and nowhere else. In contrast, in the inverter-based solution of the present disclosure, the connection from the power system 120 to the load 130 already exists. Thus, all that is needed is to isolate the load 130 from the grid 110 so that the power system 120 does not try to power the grid 110 and others relying on power from the grid or sources connected thereto (e.g., your neighbor, etc.).

Figure 4:
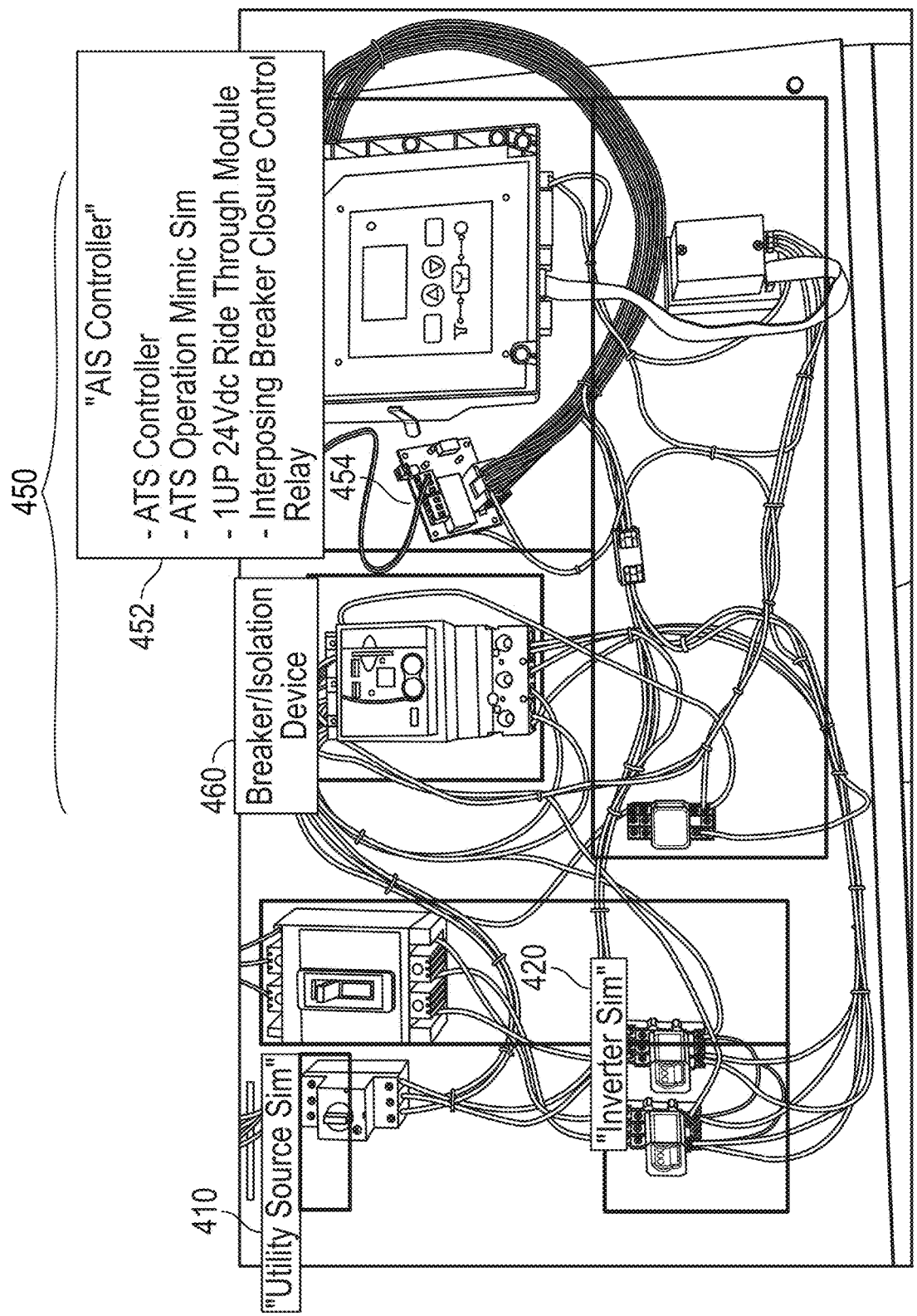
FIG. 4 illustrates an example of components of an automatic isolation switch, in accordance with an embodiment of the present disclosure.

FIG. 4 depicts an example of components of an AIS 450, which can be an example of the AIS 150 of FIG. 1. In this example, the AIS 450 can include an AIS controller 452, a switch 460 such as a breaker insolation device. As further shown, a utility source 410 and relays are provided to simulate an example grid, and an inverter (which is connectable to a power source such as for example a battery) is provided to simulate a power system 420. In this embodiment, a Green Board 454 is shown between the switch 460 and the controller 452. This is also referred to as a breakout board. In some embodiments, the function of the switching mechanism and the function of the controller mechanism can be implemented on or by a single device.

In this example, an energy storage device such as a capacitor is also shown in a white box on the Green Board 454. The capacitor can be used to store energy that is available for use by the AIS 450, under various scenarios such as described as follows. For example, the AIS 450 may require a small amount energy to perform the isolation because the power system 420 has not been turned on yet and the grid 410 is dead. The small amount of energy allows the controller 452 to continue operation long enough to determine/detect that the grid is truly dead (e.g., power outage). The small amount of energy also can allow the controller 452 to perform the isolation and then tell the battery system 420 to start or to switch battery modes. In some embodiments, the AIS 450 has at least two mechanisms, the controller 452, and a generic switch such as the switch 460. For example, an electrically operated circuit breaker can be the switch 460. In this example, the controller 452 can be an ASCO Group G controller and the switch 460 can be a Schneider Electric Square D circuit breaker. In this example, physical wire pairs of discrete wires between the controller 452 and the switch 460 are implemented.

The circuit breaker can have a spring that naturally wants to open, such as when there is too much power. For example, the circuit breaker on a hair dryer running into many outlets is spring loaded and may open to protect the wiring. The circuit breaker has a spring loaded in a coil that has two ways to operate. One is that power is provided to it all the time and when power is removed the coil opens. The other is that the spring is provided with a small amount of impulse to give it just a small amount of power so it knows to release the spring. This latter operation is how the circuit breaker can be configured to operate in the AIS 450. For example, in many applications, the circuit breaker typically stays closed. The isolation should be a rare or in frequent occurrence. In this case, the AIS 450 uses the controller 452 to send a command to purposely open the circuit breaker in order to isolate the grid 410. The capacitor can act like a low battery accessory to the controller 452. The capacitor can be used to run the power for operating the AIS 450, for example, after a configure threshold time has passed after the grid 410 goes down and before the controller 452 runs out of energy to power its components, one of the last things the controller 452 can do is send a signal to open the circuit breaker and then instruct the battery system 420 to change mode. For example, the AIS 450 can send a small amount of electrical signal to tell the coil to release, and the power for that signal is coming from the capacitor right on the controller 452.

In operation, when power supplied from the grid 410 goes off or down, the AIS 450 can wait for a certain amount of time to pass, such as a first delay timer. For example, this time threshold ensures that the grid 410 is truly down and not a false positive. The threshold may be configurable and may be adapted based on various conditions and system setups. Once the threshold time has passed, the AIS 450 can use energy stored in the capacitor or other energy storage device (e.g., uses the last bit of power from the capacitor) to send a bit signal that opens the circuit via the switch 460 (e.g., circuit breaker) and starts the isolation of the grid 410. Then, the AIS 450 can send a control signal to the power system 420 to change modes, e.g., from a grid-tie mode or grid-following mode to a grid-forming mode. The power system 420 (or component thereof such as the inverter) receives the control signal, and activates the power system 420, for example, by activating the power system 420 (e.g., turning ON the system) and changing the mode such as an inverter mode, e.g., from a grid-tie mode or grid-following mode to a grid-forming mode. In this way, the power system 420 can supply electrical power to the load.

FIG. 5 depicts an example user interface 500 for a controller of an AIS (e.g., the controller 452 in FIG. 4), in accordance with an embodiment. The user interface 500 can include inputs and outputs, including, for example, the lights and buttons disposed therein as well as the display screen. The logic of the AIS may be embedded in a type of firmware in the controller, or programming. A sequence of operations may be reprogramed in the controller. The user interface 500 can be employed to configure operational settings for the AIS (including parameters such as configurable thresholds, etc.), to control an operational mode of the AIS (e.g., automatic, manual, remote, load shed or other operation mode), or to control other functionality associated with the AIS including those described herein.

The user interface 500 can include LEDs, which can indicate various states of the power distribution system and its components, such as Breaker/Switch Closed (which equals Replaces Connected to Normal), Breaker/Switch Open or Isolated (which equals Isolated or Replaces Connected to Emergency), Line Side Power Acceptable (which equals Replaces Utility Acceptable), Load Side Power Acceptable (which equals Replaces Emergency Acceptable), Alarm (which equals stays as is), and Auto/Manual (which equals stays as is).

The user interface 500 also can output on the display screen various information, including, for example, Breaker Tripped Status (which is also an alarm), Timer is timing, Voltages, Frequency, Breaker Status, Inverter Status, Alarms or other information about the power distribution system which may be relevant to the user.

The user interface 500 also can include user inputs, such as soft buttons, which can be operated by the user to perform various operations associated with the AIS, such as for example Start Test Sequence, Bypass Timers, Auto/Manual Selector, or other operations associated with the AIS.

Figure 6:
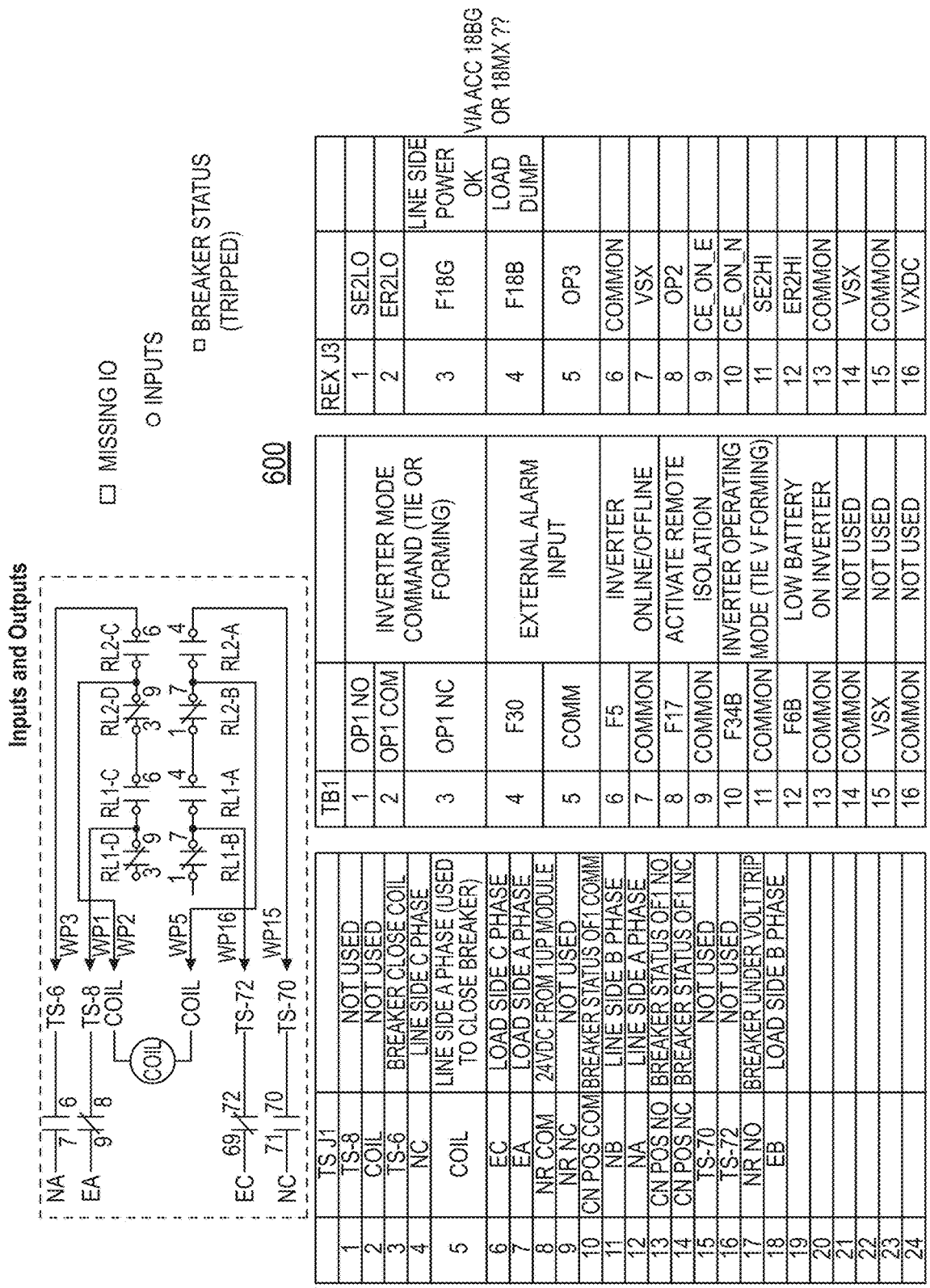
FIG. 6 illustrates an example of inputs and outputs of a controller for an automatic isolation switch, in accordance with an embodiment of the present disclosure.

FIG. 6 shows example inputs/outputs 600 of a controller for the AIS to implement the various functions and operations of the AIS, such as described herein. These inputs/outputs 600 can include inputs from a sensor(s) or other devices for detecting the state of the grid or line power (e.g., outage or other adverse power condition, power return or normal power condition, stable, unstable, voltage, frequency, etc.), inputs regarding the state of the power system (e.g., a battery system) such as the state of the inverter (e.g., online, offline, mode, etc.), and other inputs to facilitate to various operations of the AIS described herein. The inputs/outputs 600 also can include outputs for controlling the power system or components thereof including the inverter (e.g., activate/deactivate, change operational battery mode, etc.), outputs for controlling the state of one or more switches to disconnect/isolate the grid from the power system and the load or to connect/integrate the grid to the power system and the load, and outputs for controlling other operations of the AIS or power distribution system including those described herein. The outputs can also include various information, which may be accessible through a user interface (e.g., in FIG. 5).

FIG. 7 shows example dip switch settings 700 on the controller for an AIS, in accordance with an embodiment. The settings 700 can include settings for setting nominal voltage and similar setting. It should be noted that the Recovery Mode is configurable, either to provide an "open" transition back to the grid where the loads lose power and then are restored by the primary source, or a "closed" transition where the loads do not lose power while transitioning between the secondary and primary sources.

Figure 8A:
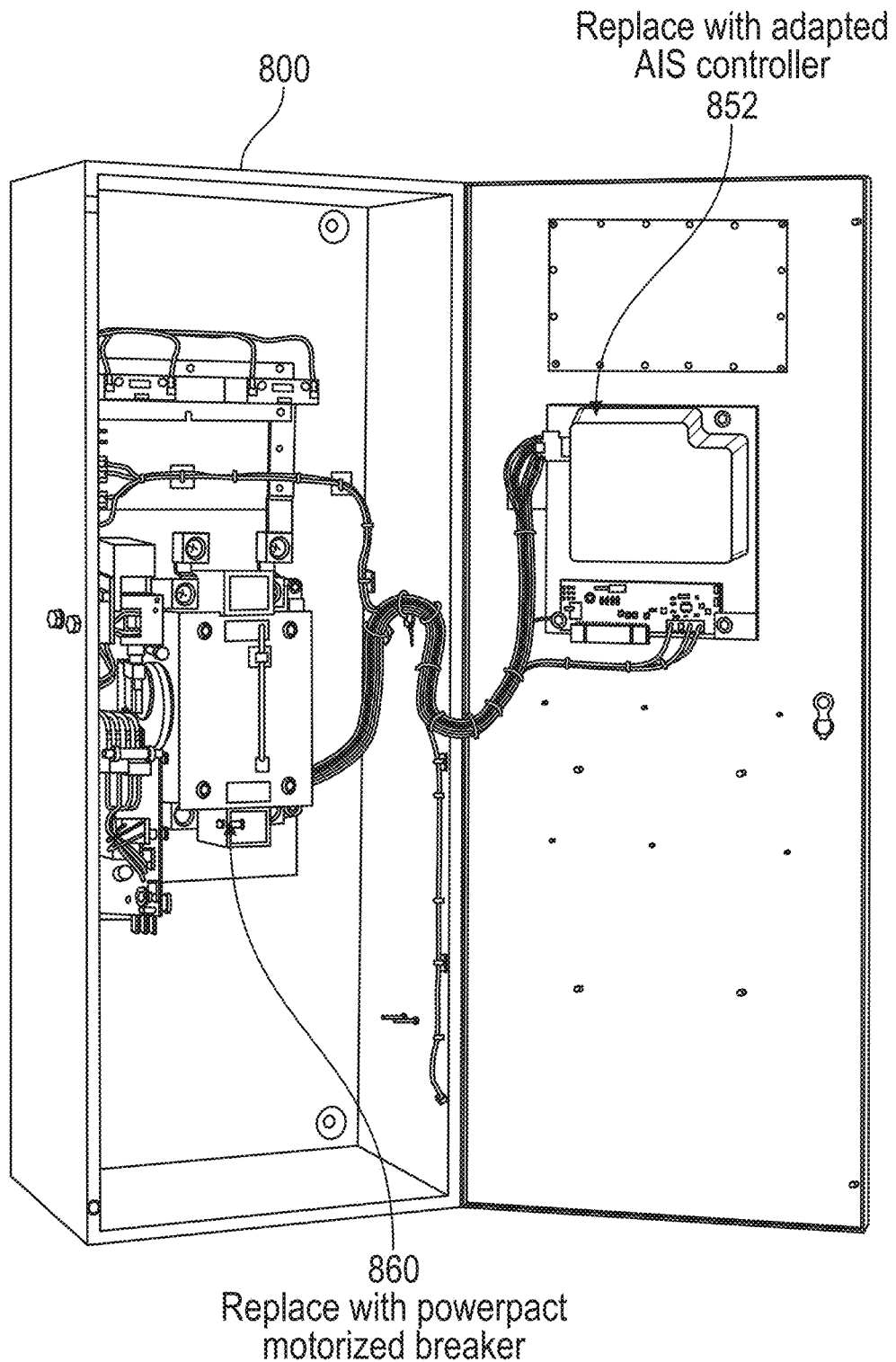
FIGS. 8A and 8B illustrate an example of a housing for an automatic isolation switch and its components, in accordance with an embodiment of the present disclosure.
Figure 8B:
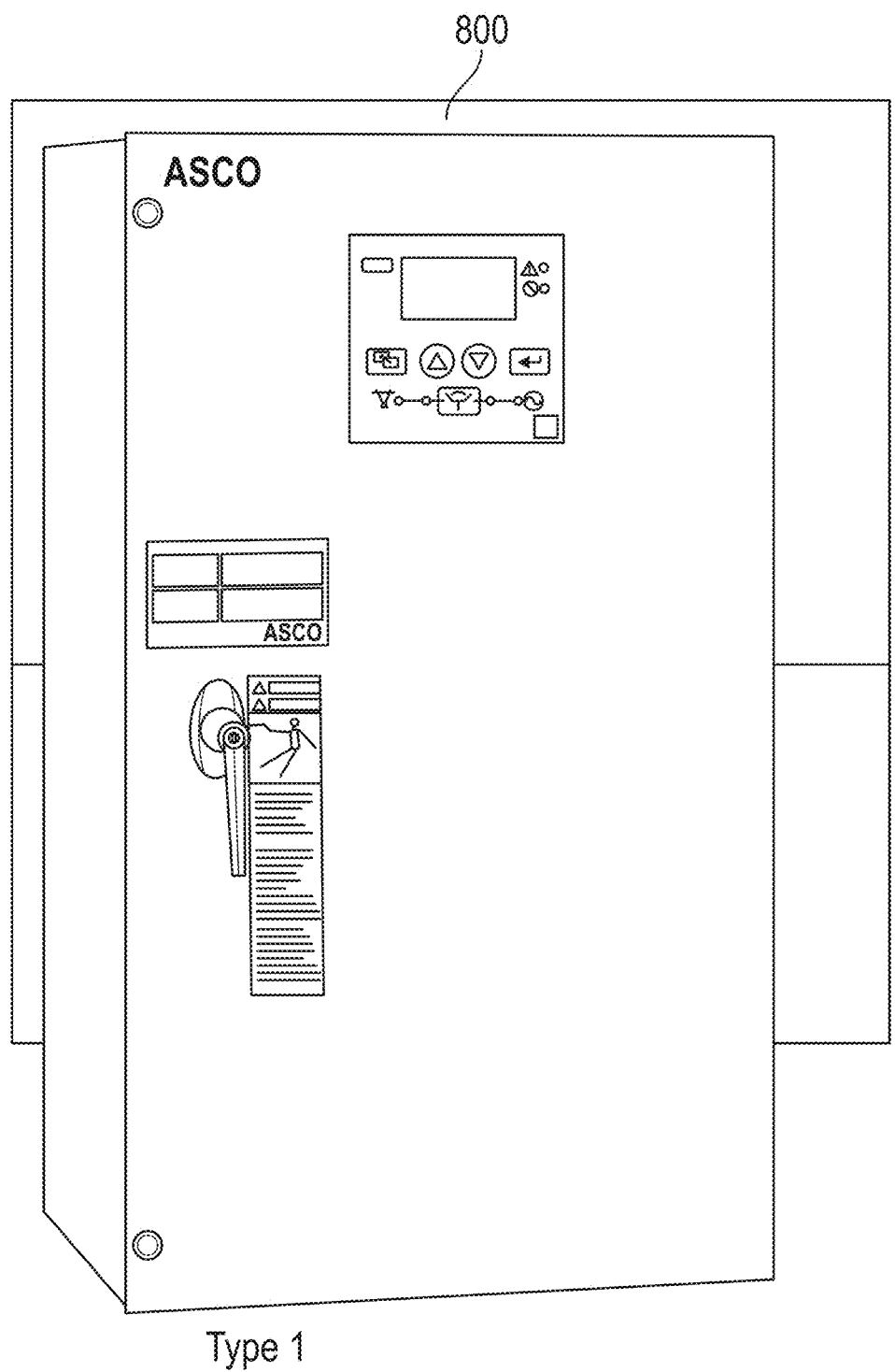

FIGS. 8A and 8B show an example components, which are housed in an electrical housing (or enclosure) 800 for an AIS such as for example in FIG. 1. For example, instead of the transfer switch (e.g., ATS 250 as in FIG. 2A) in the housing 800, an AIS can be implemented by installing an isolation switch 860, such as for example a circuit breaker, with an AIS controller 852 mounted on the door of the housing 800. The AIS controller 852 can be communicatively coupled to the circuit breaker and the power system (e.g., a battery system, etc.) to control the operations thereof, including those described herein.

Figure 9:
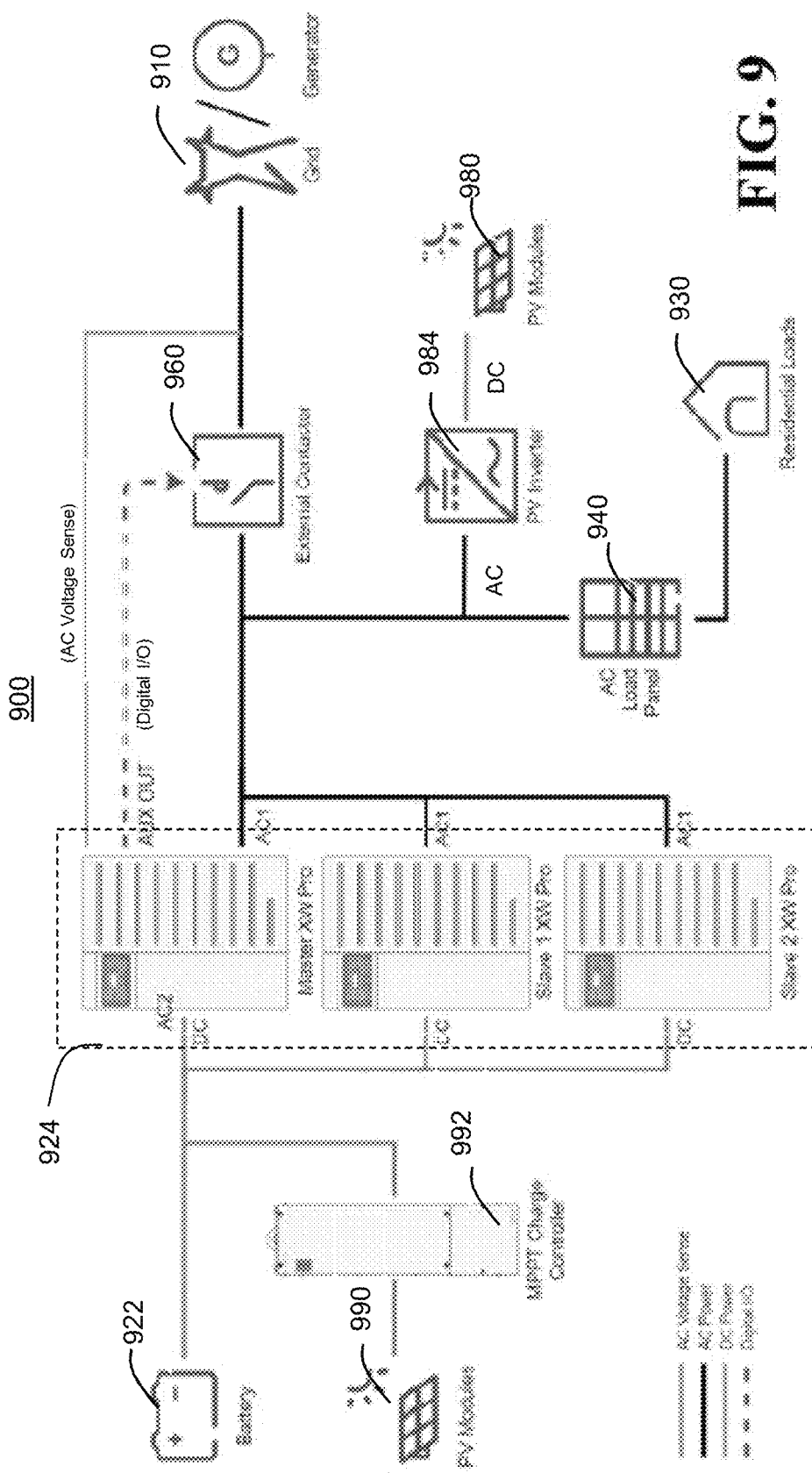
FIG. 9 illustrates an example of an automatic isolation switch used in a power distribution system with a solar power system(s) or source(s), in accordance with an embodiment of the present disclosure.

FIG. 9 illustrates an example of a power distribution system 900 in which an automatic isolation switch (AIS) can be used in combination with a solar power system, in accordance with an embodiment. In this example, the power distribution system 900 includes various power sources (or systems). These power sources can include a grid/generator 910, a solar power system with solar photovoltaic (PV) modules 980 and inverter 984 coupled thereto, and a battery system. The power system can include a battery 922, inverter(s) 924, PV module(s) 990 and charge controller 992 for controlling the charging of the battery using energy from the PV module(s) 990. The power sources can supply power to the load 930 (e.g., residential loads of a house) across an AC load panel 940. The power distributions system 900 includes at least one AIS switch 960 (e.g., a contactor), which can be controlled by an AIS controller in the inverter 924 via control signals (e.g., AUX OUT).

The AIS controller can be configured to isolate, via the AIS switch 960, the grid/generator 910 from the power system, load and other power sources such as the PV modules in response to detection of a power outage or other adverse power condition on the grid/generator 910. The AIS controller also can be configured to connect/integrate, via the AIS switch 960, the grid/generator 910 to the power system, load and other power sources such as the PV modules 980 in response to detection of return of power (or normal power) at the grid/generator 910. The AIS controller also can be configured to control the operational mode of the power system (or components thereof) including to activate the power system to supply power to the load 930 such as when the grid/generator 910 is disconnected/isolated (e.g., implement grid-forming mode) or to control the power system to operate in other operational battery modes (e.g., grid-tie mode, grid-following mode, etc.) when the grid/generator 910, which is operating normally, is connected/integrated. The AIS controller can be configured to perform other AIS controller, such as described herein.

In various embodiments, the charge controller 992 can be a Maximum Power Point Tracking (MPPT) charge controller, and the inverter(s) 924 can include XW Pro Inverters (manufactured by Schneider Electric) which can be configured in a master-slave configuration. In various embodiments, the energy from the PB module 980 or the battery 922 can be supplied as electrical energy to the grid or the load, according to state of the power distribution system 900 or components thereof.

Figure 10:
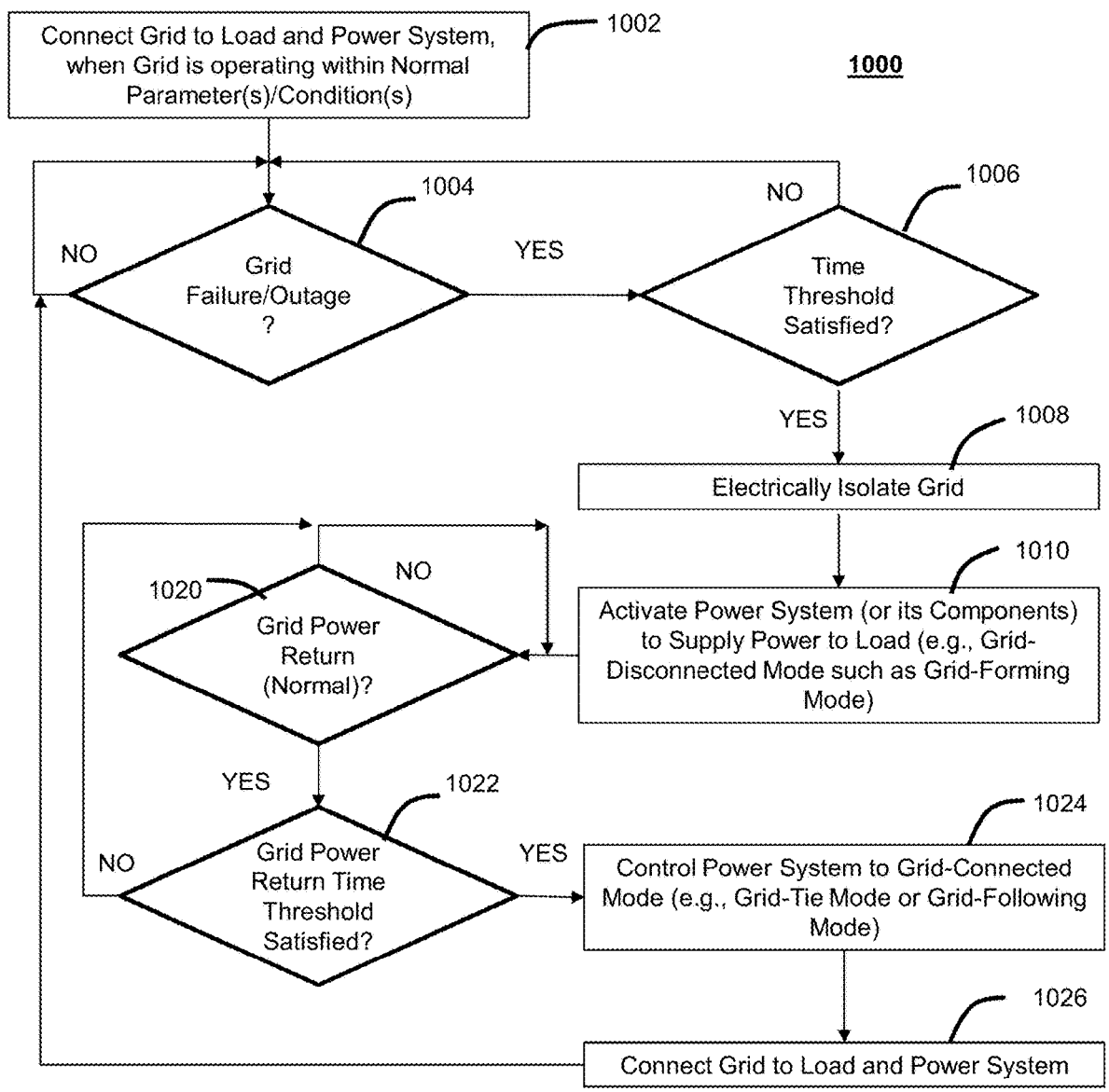
FIG. 10 is a flow chart illustrating an example process by which to operate an automatic isolation switch, in accordance with an embodiment of the present disclosure.

FIG. 10 is a flow chart illustrating an example process 1000 for operating an automatic isolation switch, in accordance with an embodiment. By way of example, the process 1000 will be described with reference to the AIS and its components, such as controller and at least one switch (e.g., FIGS. 1 and 4). The operations of the AIS can be performed under control of the controller.

The process 1000 begins at block 1002 in which the AIS connects a grid to a load and a power system, when the grid is detected as operating within normal parameters (e.g., power at the grid). The power system can, for example, be a battery system or other inverter-based power system for supplying electrical power. At block 1004, the AIS detects whether a power outage or other adverse power condition has occurred as to the power supplied from the grid. If the grid or its associated power system is operating normally or within normal power condition(s), the process 1000 continues to monitor for power outage at block 1004. Otherwise, if an outage or other adverse power condition is detected, the AIS detects whether an amount of time of the detected condition satisfies a time/duration threshold at block 1006. A timer can be employed to track an amount of time of the detected adverse power condition. If the amount of time of the detected adverse condition does not satisfy the time/duration threshold, the process 1000 returns to block 1004.

If the amount of time of the detected outage or other adverse power condition does satisfy the time/duration threshold, the AIS electrically isolates the grid using the at least one switch (e.g., opens the switch) at block 1008. For example, the AIS can operate the at least one switch to disconnect the grid from the power system and the load. This delay period can be provided to reduce false positive detection of a power outage or other adverse power condition at the grid.

At block 1010, the AIS activates the power system to supply power to the load. For example, the AIS can activate the power system to implement a grid-forming mode, in which the power system can form a microgrid with the load and supply electrical power thereto. In this way, the power system can supply electrical power to the load when the grid (or power supplied from the grid) is down.

In various embodiments, in the event of a power outage or other adverse power condition, the AIS can control the power system to selectively supply power to the load, e.g., periodically or aperiodically turn ON and OFF the supply of power from the power system to the load, or delay (e.g., time delay for a determined or predefined time period) turning ON the supply of power from the power system. In other words, the AIS can control the power systems or its components such as the inverter, directly or indirectly, to delay or stop for a period of time a supply of electrical power from the power system to the load during the power outage (or while the adverse power condition exists or persists). In this way, the AIS can conserve energy from the power system, which may be limited. For example, to control supply of power from the power system, the AIS can selectively control the isolation switch and/or the inverter of the power system, according to various factors including but not limited to: an amount of available energy on the battery system (which may be monitored using a sensor), a length of time of the outage or other adverse power condition (which may be monitored using a counter/timer from when the adverse power condition occurs), a predefined schedule(s), the nature or severity of the adverse power condition, and so forth.

At block 1020, the AIS detects whether a return of power (or return to normal power condition(s)) has occurred as to the power supplied from the grid (e.g., the grid has returned to normal operations). If the grid is still out, the process 1000 continues to monitor for a return of power at block 1020. Otherwise, if a return of power (or normal power condition) is detected, the AIS detects whether an amount of time of the detected power return to the grid satisfies a power return time/duration threshold at block 1022. A power return timer can be employed to track an amount of time of the power return. If the amount of time of the detected power return does not satisfy the power return time/duration threshold, the process 1000 returns to block 1020.

If the amount of time of the detected power return does satisfy the power time/duration threshold, the AIS can control the power system to operate in a grid-connected mode (e.g., grid-tie mode or grid-following mode) at block 1024, and can connect/integrate the grid using the at least one switch (e.g., opens the switch) at block 1026. For example, the AIS can operate the at least one switch to connect or re-connect the grid to the power system and the load. This delay period can be provided to reduce false positive detection of a power return (or return to normal power condition(s)) at the grid or systems associated therewith. In this way, the grid has returned to supplying electrical power to the load. Thereafter, the process 1000 can return to block 1004.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method of controlling a supply of electrical power to a load in a power distribution system, the power distribution system comprising a first power system, a second power system, and an isolation switch system having at least one switch, the method comprising:
    detecting, by a controller, an adverse power condition on the first power system for supplying the electrical power to the load, the first power system including a grid;
    isolating, by the at least one switch controlled by the controller, the first power system from the load and the second power system, in response to the detecting of the adverse power condition, the second power system including a power source comprising a battery or fuel cell and an inverter, coupled to the power source, for supplying the electrical power from the power source; and
    activating, by the controller, the inverter of the second power system to supply the electrical power from the second power system to the load,
    wherein the activating comprises controlling the inverter to delay or stop for a period of time the supply of the electrical power from the second power system to the load while the adverse power condition continues on the first power system,
    wherein the controller is configured to implement a plurality of configurable modes including an automatic control mode, a remote-controlled mode, and a manual control mode, the controller being selectively configurable to implement a mode from the plurality of configurable modes via a user interface.

2. The method according to claim 1, wherein the isolating isolates the first power system when an amount of time of the detected adverse power condition on the first power system meets a first time threshold.

3. The method according to claim 1, wherein the activating comprises:
controlling, by the controller, the inverter, via a control signal, to implement a grid-forming mode for supplying the electrical power from the second power system to the load via the inverter.

4. The method according to claim 1, further comprising:
detecting a return of electrical power supplied from the first power system;
connecting, by the at least one switch, the first power system to the load and the second power system to enable the supply of the electrical power from the first power system to the load in response to detecting the return of electrical power; and
controlling, by the controller, the inverter, via a control signal, to implement:
a grid-tie mode for supplying the electrical power from the second power system to the first power system, in response to detecting the return of electrical power, or
a grid-following mode for enabling supply of the electrical power from the first power system including the grid to the load in response to detecting the return of electrical power.

5. The method according to claim 4, wherein the connecting connects, by the at least one switch, the first power system to the load and the second power system when an amount of time of the return of electrical power at the first power system meets a second time threshold.

6. The method according to claim 1, further comprising:
storing energy in a capacitor; and
powering, via the stored energy from the capacitor, at least the controller to enable operation of the controller for at least a period of time after the adverse power condition occurs on the first power system.

7. The method according to claim 1, wherein the second power system is automatically de-activated when the adverse power condition occurs,
wherein the adverse power condition comprises a power outage.

8. The method according to claim 1, wherein, while the adverse power condition continues on the first power system, the inverter is controlled to delay or stop for the period time the supply of the electrical power from the battery or fuel cell of the second power system to the load in order to conserve energy of the battery or fuel cell of the second power system, and
wherein while the adverse power condition continues on the first power system, the inverter is controlled to delay or stop for the period time the supply of the electrical power from the battery or fuel cell of the second power system to the load according to an amount of available energy on the battery or fuel cell, a length of time of the adverse power condition, a predefined schedule(s), or a nature or severity of the adverse power condition.

9. The method according to claim 1, wherein the controller is the controller of the isolation switch system, and
wherein the controller of the isolation switch system is configured to:
control the at least one switch between a first state in which the first power system, the second power system and the load are connected to each other, and a second state in which the first power system is isolated from the second power system and the load which are connected to each other, the at least one switch being controlled by the controller to operate in the second state in response to the detecting of the adverse power condition, and
control transmission of a control signal from the isolation switch system to the second power system for activating the inverter to supply the electrical power from the second power system to the load.

10. The method according to claim 1, wherein the controller is the controller of the second power system.

11. The method according to claim 1, wherein the plurality of configurable modes further includes a load shed mode configured to disconnect the load from the first and/or second power systems upon occurrence of a predetermined condition.

12. A system for controlling a supply of electrical power to a load in a power distribution system, the system comprising:
an isolation switch system including at least one switch connected between a first power system and the load and between the first power system and a second power system, the first power system including a grid, the second power system including a power source comprising a battery or fuel cell and an inverter, coupled to the power source, for supplying the electrical power from the power source; and
a controller configured to:
detect an adverse power condition on the first power system for supplying the electrical power to the load,
isolate, via the at least one switch, the first power system from the load and the second power system, in response to the detected adverse power condition, and
activate the inverter of the second power system to supply the electrical power from the second power system to the load,
wherein the controller is configured to control the inverter to delay or stop for a period of time the supply of the electrical power from the second power system to the load while the adverse power condition continues on the first power system,
wherein the controller is configured to implement a plurality of configurable modes including an automatic control mode, a remote-controlled mode, and a manual control mode, the controller being selectively configurable to implement a mode from the plurality of configurable modes via a user interface.

13. The system according to claim 12, wherein the controller is configured to isolate the first power system when an amount of time of the detected adverse power condition on the first power system meets a first time threshold.

14. The system according to claim 12, wherein, to activate the inverter, the controller is configured to control, via a control signal, the inverter to implement a grid-forming mode for supplying the electrical power from the second power system to the load via the inverter.

15. The system according to claim 12, wherein the controller is further configured to:
detect return of electrical power supplied from the first power system;
connect, via the at least one switch, the first power system to the load and the second power system to enable the supply of the electrical power from the first power system to the load in response to the detected return of electrical power; and control the inverter, via a control signal, to implement:
a grid-tie mode for supplying the electrical power from the second power system to the first power system, in response to the detected return of electrical power, or
a grid-following mode for enabling the supply of the electrical power from the first power system including the grid to the load in response to the detected return of electrical power.

16. The system according to claim 15, wherein the at least one switch is configured to connect the first power system to the load and the second power system when an amount of time of the return of electrical power at the first power system meets a second time threshold.

17. The system according to claim 12, further comprising:
a capacitor for storing energy,
wherein the controller is configured to be powered, via the stored energy from the capacitor, to enable operation of the controller for at least a period of time after the adverse power condition occurs on the first power system.

18. The system according to claim 12, wherein the second power system is configured to be automatically de-activated when the adverse power condition occurs,
wherein the adverse power condition comprises a power outage.

19. The system according to claim 12, further comprising:
the user interface for the controller; and
an electrical enclosure for housing the at least one switch, and the controller.

20. The system according to claim 12, wherein the controller is a controller of the isolation switch system, and
wherein the controller of the isolation switch system is configured to:
control the at least one switch between a first state in which the first power system, the second power system and the load are connected to each other, and a second state in which the first power system is isolated from the second power system and the load which are connected to each other, the at least one switch being controlled by the controller to operate in the second state in response to the detecting of the adverse power condition, and
control transmission of a control signal from the isolation switch system to the second power system for activating the inverter to supply the electrical power from the second power system to the load.

21. The system according to claim 12, wherein the plurality of configurable modes further includes a load shed mode configured to disconnect the load from the first and/or second power systems upon occurrence of a predetermined condition.

22. A non-transitory computer readable medium storing computer code, which when executed by a controller, performs a method of controlling a supply of electrical power to a load in a power distribution system, the power distribution system comprising a first power system, a second power system, and an isolation switch system having at least one switch, the method comprising:
detecting an adverse power condition on the first power system for supplying the electrical power to the load, the first power system including a grid;
controlling the at least one switch to isolate the first power system from the load and the second power system, in response to the detecting of the adverse power condition, the second power system including a power source comprising a battery or a fuel cell and an inverter, coupled to the power source, for supplying the electrical power from the power source; and
activating the inverter of the second power system to supply the electrical power from the second power system to the load,
wherein the activating comprises controlling the inverter to delay or stop for a period of time the supply of the electrical power from the second power system to the load while the adverse power condition continues on the first power system,
wherein the controller is configured to implement a plurality of configurable modes including an automatic control mode, a remote-controlled mode, and a manual control mode, the controller being selectively configurable to implement a mode from the plurality of configurable modes via a user interface.

23. The non-transitory computer readable medium according to claim 22, wherein the plurality of configurable modes further includes a load shed mode configured to disconnect the load from the first and/or second power systems upon occurrence of a predetermined condition.

* * * * *